(12) United States Patent
Cho et al.

(10) Patent No.: US 10,910,630 B2
(45) Date of Patent: Feb. 2, 2021

(54) ELECTRODE FOR ALL SOLID TYPE BATTERY AND METHOD FOR MANUFACTURING THE SAME

(71) Applicant: LG CHEM, LTD., Seoul (KR)

(72) Inventors: Sung-Ju Cho, Daejeon (KR); Ho-Suk Shin, Daejeon (KR); Seung-He Woo, Daejeon (KR); Sung-Joong Kang, Daejeon (KR); Hyea-Eun Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 49 days.

(21) Appl. No.: 16/332,476

(22) PCT Filed: May 15, 2018

(86) PCT No.: PCT/KR2018/005569
§ 371 (c)(1),
(2) Date: Mar. 12, 2019

(87) PCT Pub. No.: WO2018/212567
PCT Pub. Date: Nov. 22, 2018

(65) Prior Publication Data
US 2019/0237747 A1    Aug. 1, 2019

(30) Foreign Application Priority Data

May 15, 2017 (KR) .................. 10-2017-0060064

(51) Int. Cl.
*H01M 6/18* (2006.01)
*H01M 4/04* (2006.01)
(Continued)

(52) U.S. Cl.
CPC ........... *H01M 4/0471* (2013.01); *H01M 4/04* (2013.01); *H01M 4/045* (2013.01); *H01M 4/13* (2013.01);
(Continued)

(58) Field of Classification Search
CPC ...... H01M 4/0471; H01M 4/04; H01M 4/045; H01M 4/13; H01M 4/139; H01M 4/62;
(Continued)

(56) References Cited

U.S. PATENT DOCUMENTS

2004/0101752 A1* 5/2004 Oosawa .............. H01M 4/0416
429/217
2006/0127764 A1* 6/2006 Chen .................... H01M 4/622
429/217
(Continued)

FOREIGN PATENT DOCUMENTS

EP    1 961 060 A2    8/2008
JP    2008-153006 A    7/2008
(Continued)

OTHER PUBLICATIONS

International Search Report (PCT/ISA/210) issued in PCT/KR2018/005569, dated Sep. 3, 2018.

*Primary Examiner* — Raymond Alejandro
(74) *Attorney, Agent, or Firm* — Birch, Stewart, Kolasch & Birch, LLP

(57) ABSTRACT

An electrode for an all solid type battery is designed such that fibrous carbon materials serving as a conductor are densely arranged crossed into a 3-dimensional structure in the form of a mesh of a nonwoven fabric-like shape, and an inorganic solid electrolyte and electrode active material particles are impregnated and uniformly dispersed in the structure. By this structural feature, the electrode for an all solid type battery has very good electron conductivity and ionic conductivity.

6 Claims, 5 Drawing Sheets

(51) Int. Cl.
   *H01M 10/0525* (2010.01)
   *H01M 4/139* (2010.01)
   *H01M 10/0565* (2010.01)
   *H01M 4/62* (2006.01)
   *H01M 4/13* (2010.01)
   *H01M 10/0562* (2010.01)

(52) U.S. Cl.
   CPC .......... *H01M 4/139* (2013.01); *H01M 4/62* (2013.01); *H01M 10/0525* (2013.01); *H01M 10/0562* (2013.01); *H01M 10/0565* (2013.01); *H01M 2300/0082* (2013.01)

(58) Field of Classification Search
   CPC ........... H01M 10/0525; H01M 10/052; H01M 10/0562; H01M 10/0565; H01M 2300/0082
   See application file for complete search history.

(56) References Cited

U.S. PATENT DOCUMENTS

| | | | |
|---|---|---|---|
| 2008/0020283 A1 | 1/2008 | Miyashiro et al. | |
| 2009/0197183 A1 | 8/2009 | Kato | |
| 2009/0226790 A1 | 9/2009 | Kanamura et al. | |
| 2009/0291366 A1* | 11/2009 | Stevanovic | H01M 6/16 429/221 |
| 2011/0065007 A1 | 3/2011 | Kamiya et al. | |
| 2013/0122391 A1 | 5/2013 | Sasaki et al. | |
| 2015/0017550 A1 | 1/2015 | Nishimura et al. | |
| 2015/0017863 A1 | 1/2015 | Kitano et al. | |
| 2016/0049662 A1* | 2/2016 | Kim | H01M 4/043 429/211 |
| 2016/0218349 A1 | 7/2016 | Hasegawa et al. | |
| 2017/0033350 A1 | 2/2017 | Mizuno et al. | |
| 2018/0248175 A1 | 8/2018 | Ghezelbash et al. | |

FOREIGN PATENT DOCUMENTS

| | | |
|---|---|---|
| JP | 2009-181877 A | 8/2009 |
| JP | 2009-238739 A | 10/2009 |
| JP | 2010-262764 A | 11/2010 |
| JP | 2011-60649 A | 3/2011 |
| JP | 2013-89403 A | 5/2013 |
| JP | 2015-69795 A | 4/2015 |
| KR | 10-2003-0024468 A | 3/2003 |
| KR | 10-2007-0034104 A | 3/2007 |
| KR | 10-2014-0017105 A | 2/2014 |
| KR | 10-2014-0137362 A | 12/2014 |
| KR | 10-2016-0043939 A | 4/2016 |
| KR | 10-2016-0062617 A | 6/2016 |
| KR | 104728828 B1 | 4/2017 |
| KR | 10-2017-0050234 A | 5/2017 |
| WO | WO 2007/061928 A2 | 5/2007 |
| WO | WO 2011/089754 A | 7/2011 |
| WO | WO 2015/093411 A | 6/2015 |
| WO | WO 2018/160498 A1 | 9/2018 |

* cited by examiner

ELECTRODE FOR ALL SOLID TYPE BATTERY AND METHOD FOR MANUFACTURING THE SAME

TECHNICAL FIELD

The present application claims priority to Korean Patent Application No. 10-2017-0060064 filed in the Republic of Korea on May 15, 2017, the disclosure of which is incorporated herein by reference. The present disclosure relates to an electrode for an all solid type battery with improved electron conductivity and a method for manufacturing the same.

BACKGROUND ART

Lithium ion secondary batteries are being widely used as a power source device for portable electronic devices. Additionally, there is a recent movement toward the use of lithium ion secondary batteries in applications of electric vehicles or industrial batteries. The structure of lithium ion secondary batteries is relatively simple; their three elements are a negative electrode active material, a positive electrode active material and an electrolyte solution. Batteries work by movements of lithium ions from the positive electrode to the negative electrode and from the negative electrode to the positive electrode. The electrolyte part only acts as a lithium ionic conductor. The widely used lithium ion secondary batteries use an electrolyte solution in which a lithium salt is dissolved in a non-protonic organic solvent. However, this electrolyte solution has a potential problem in use due to electrolyte solution leakage or gas generation, and to solve this problem, there is a need for development of all solid type batteries.

In an all solid type battery, it is known that contact resistance between active material particles responsible for battery reactions or between active material particles and solid electrolyte particles greatly affects the internal resistance of the battery. Particularly, as charging and discharging repeat, volume changes of the active material occur, contact of an active material with a solid electrolyte or a conducting agent reduces, and there is a tendency to increase the internal resistance or reduce the capacity. Accordingly, technology has been proposed to improve the contact between the particles of the active material or the solid electrolyte and suppress the increase in internal resistance. In the all solid type battery, to reduce the contact resistance between the active material particles responsible for battery reactions or the active material particles and the solid electrolyte particles and contribute to the high capacity, it is necessary to bring the particles into close contact in order to improve the contact between these particles and minimize a gap between the particles. However, because the conventional electrode still has a large gap between the active material particles, it is difficult to improve both the contact and the energy density. Accordingly, the present disclosure aims at providing an electrode for an all solid type battery with good contact between active material particles, reduced internal resistance and increased ionic conductivity, and a method for manufacturing the same.

DISCLOSURE

Technical Problem

The present disclosure is directed to providing an electrode with improved electron conductivity and ionic conductivity in an all solid type battery. The present disclosure is further directed to providing a new method for manufacturing the electrode. Additionally, it is apparent that the objects and advantages of the present disclosure may be realized by the means or method set forth in the appended claims and combinations thereof.

Technical Solution

The present disclosure relates to an electrode for an all solid type battery for solving the above-described technical problem and a method for manufacturing the same.

A first aspect of the present disclosure relates to the above-described method, and the above-described method includes preparing a nonwoven fabric precursor in which a plurality of polymer filaments is gathered, preparing an electrode forming slurry, mixing the nonwoven fabric precursor with the electrode forming slurry to form a mix phase, drying the mix phase to obtain a preliminary electrode, pressing the preliminary electrode, and performing a sintering step by thermally treating the pressed preliminary electrode to carbonize the polymer filaments, wherein the electrode forming slurry includes an electrode active material, an inorganic solid electrolyte and a solvent.

According to a second aspect of the present disclosure, in the first aspect, the polymer filaments are prepared by spinning a polymer material by an electrospinning method.

According to a third aspect of the present disclosure, in any one of the first and second aspects, the electrode active material and the inorganic solid electrolyte are in a form of particles.

According to a fourth aspect of the present disclosure, in any one of the first to third aspects, the inorganic solid electrolyte includes an oxide-based inorganic solid electrolyte.

According to a fifth aspect of the present disclosure, in any one of the first to fourth aspects, the pressing is performed by a hot pressing method.

According to a sixth aspect of the present disclosure, in any one of the first to fifth aspects, the polymer filaments are 50 μm to 500 μm long.

A seventh aspect of the present disclosure relates to an electrode for an all solid type battery, and the electrode includes an electrode active material, an inorganic solid electrolyte and fibrous carbon materials, wherein the fibrous carbon materials are entangled and arranged crossed and linked to form a 3-dimensional mesh structure, an inside of the mesh structure is filled with a mixture of the inorganic solid electrolyte and the electrode active material, and the fibrous carbon materials are 50 μm to 500 μm long.

According to an eighth aspect of the present disclosure, in the seventh aspect, the carbon material is derived from a polymer material, and is a carbonization product obtained by sintering the polymer material at high temperature.

According to a ninth aspect of the present disclosure, in any one of the seventh and eighth aspects, the polymer material is one selected from the group consisting of polyolefin, polyester, polyamide, polyacetal, polycarbonate, polyimide, polyetherketone, polyethersulfone, polyphenyleneoxide, polyphenylenesulfide, polyvinyledene fluoride, polyvinyl chloride, polyacrylonitrile, cellulose and polyparaphenylenebenzobisoxazole, or mixtures thereof.

According to a tenth aspect of the present disclosure, in any one of the seventh to ninth aspects, the inorganic solid electrolyte includes an oxide-based inorganic solid electrolyte.

According to an eleventh aspect of the present disclosure, in the tenth aspect, the oxide-based inorganic solid electrolyte includes at least one selected from LLTO-based compound. $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $Li_9SiAlO_8$, LAGP-based compound. LATP-based compound, $Li_{1+x}Ti_{2-x}Al_xSi_y(PO_4)_{3-y}$ (where 0≤x≤1, 0≤y≤1), $LiAl_xZr_{2-x}(PO_4)_3$ (where 0≤x≤1, 0≤y≤1), $LiTi_xZr_{2-x}(PO_4)_3$ (where 0≤x≤1, 0≤y≤1), LISICON-based compound, LIPON-based compound, perovskite-based compound, NASICON-based compound and LLZO-based compound.

Advantageous Effects

The electrode for an all solid type battery according to the present disclosure is designed such that fibrous carbon materials serving as a conductor are densely arranged cross into a 3-dimensional structure in the form of a mesh of a nonwoven fabric-like shape, and an inorganic solid electrolyte and electrode active material particles are impregnated and uniformly dispersed in the structure. By this structural feature, the electrode for an all solid type battery according to the present disclosure has very good electron conductivity and ionic conductivity.

Additionally, the electrode for an all solid type battery according to the present disclosure can be uniformly filled with an electrode slurry by mixing a nonwoven fabric precursor in uncompressed state of a nonwoven fabric and an electrode forming slurry, and has a high fill ratio of the electrode slurry. Additionally, the electrode slurry filling process is followed by carbonization of the nonwoven fabric precursor to give conductivity. Accordingly, when compared to an electrode slurry generally prepared by introducing a conductive material, electrode active material particles and an inorganic solid electrolyte in a solvent, a problem that each component is not dispersed well and agglomerates is solved, and each component shows very high level of mix phase in the electrode.

BRIEF DESCRIPTION OF THE DRAWINGS

The accompanying drawings illustrate a preferred embodiment of the present disclosure, and together with the detailed description, serve to provide further understanding of the technical aspects of the present disclosure, and thus, the present disclosure should not be construed as being limited to the drawings. Meanwhile, the shape, size, scale or proportion of the elements in the drawings as used herein may be exaggerated to emphasize more clear description.

MODE FOR CARRYING OUT THE INVENTION

Figure 1:
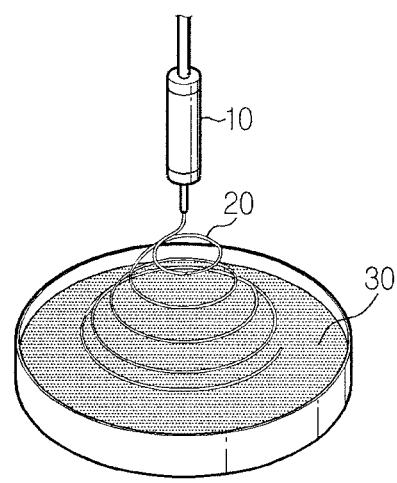
FIG. 1 shows schematically an electrospinning process according to an embodiment of the present disclosure.

Hereinafter, the present disclosure will be described in detail. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

The term [comprises] when used in this specification, specifies the presence of stated elements, but docs not preclude the presence or addition of one or more other elements, unless the context clearly indicates otherwise. The terms [about] and [substantially] are used herein in the sense of at, or nearly at, when given the manufacturing and material tolerances inherent in the stated circumstances and are used to prevent the unscrupulous infringer from unfairly taking advantage of the invention disclosure where exact or absolute figures are stated as an aid to understanding the invention.

[A and or B] when used in this specification, specifics [either A or B or both].

In the following specification of the present disclosure, specific terms are used for convenience and are not limiting. The terms 'right', 'left' 'top' and 'bottom' refer to the directions in the drawings to which reference is made. The terms 'inward' and 'outward' refer to the directions toward or away from the geometrical centers of the designated devices, systems and members thereof. The terms 'front', 'rear', 'up', 'down' and related words and phrases refer to the locations and directions in the drawing to which reference is made and are not limiting. These terms include the above-listed words, derivatives thereof and synonyms thereof.

The present disclosure relates to an electrode for an all solid type battery and an electrochemical device comprising the same. Additionally, the present disclosure relates to a method for manufacturing the electrode. In the present disclosure, the electrochemical device may be, for example, a lithium ion secondary battery, and may be an all solid type battery using either a polymer electrolyte or an inorganic solid electrolyte or both as a solid electrolyte.

In the present disclosure, the electrode includes a mix phase including a plurality of electrode active materials, a plurality of inorganic solid electrolytes and a plurality of fibrous carbon materials. Here, the fibrous carbon materials are entangled and arranged cross and linked to form a 3-dimensional mesh structure. In a particular embodiment of the present disclosure, the 3-dimensional mesh structure is formed by entanglement of filaments of the fibrous carbon materials, and may show a nonwoven fabric-like structure that is similar to a nonwoven fabric. That is, the 3-dimensional mesh structure is a 3-dimensional structure of the fibrous carbon materials arranged cross, and may show a shape of a 3-dimensional mesh.

In an embodiment of the present disclosure, the electrode may have a 3-dimensional mesh structure of fibrous carbon materials filled with a mixture (electrode formulation) including inorganic solid electrolyte particles and electrode active material particles.

In a particular embodiment of the present disclosure, the mesh structure of the fibrous carbon materials arranged cross may be derived from a nonwoven fabric or nonwoven fabric-like polymer structure including a polymer material as described below, and may be a carbide formed by carbonization of the polymer material by high temperature sintering. In an embodiment of the present disclosure, the fibrous carbon materials may be, for example, carbon nanofiber (CNF). Meanwhile, the diameter of filaments of the fibrous carbon materials may be 100 nm to 5 µm, and in the above-described range, the diameter may be 300 nm or more, 500 nm or more, 700 nm or more, 1 µm or more, 2 µm or more, 3 µm or more, or 4 µm or more, or the diameter may be 4 µm or less, 3 µm or less, 2 µm or less, 1.5 µm or less, 1 µm or less, 800 nm or less, or 500 nm or less. Additionally, in a particular embodiment of the present disclosure, an aspect ratio of filaments of the fibrous carbon materials may be more than 50, and for example, the length of filaments may be 50 µm to 500 µm. In an embodiment of the present disclosure, the length of filaments may be, in the above-described range, 70 µm or more, 100 µm or more, 200 µm or more, 300 µm or more, or 400 µm or more, or the length may be, in the above-described range, 400 µm or less, 300 µm or less, 200 µm or less, 100 µm or less, or 70 µm or less. In an embodiment of the present disclosure, the diameter and length of filaments can be identified through shape observation through SEM image analysis. The electrode including the 3-dimensional structure obtained in this way avoids agglomeration of a conductive material or consequential local distribution, and achieves uniform distribution of a conductive material over the electrode, which is very advantageous in electrical conductivity improvement, compared to an electrode obtained from an electrode slurry prepared by simply mixing with a conductive material such as CNF or VGCF.

In an embodiment of the present disclosure, the fibrous carbon materials come from a polymer material as described below, and includes a carbide formed by carbonization by high temperature sintering. The 3-dimensional mesh structure includes a carbon material that is a carbide formed by carbonizing a polymer material at least in part or in whole, or 80 vol % or more, 90 vol % or more, 95 vol % or more, or 99 vol % or more of the polymer material.

The polymer material may be used in a common nonwoven fabric manufacturing process and may be spun into polymer filaments having the above-described range of diameters and lengths by electrospinning, and the polymer material is not limited to a particular type and may include any polymer material that is likely to be carbonized into a carbon material by a sintering process described below.

In a particular embodiment of the present disclosure, the polymer material may be thermoplastic resin and/or thermosetting resin. Its non-limiting example may include any one selected from the group consisting of polyolefin including polyethylene and polypropylene, polyester including polyethyleneteraphthalate and polybutyleneterephthalate, polyamide including aramid, polyacetal, polycarbonate, polyimide, polyetherketone, polyethersulfone, polyphenyleneoxide, polyphenylenesulfide, polyethylenenaphthalene, polytetrafluoroethylene, polyvinyledene fluoride, polyvinyl chloride, polyacrylonitrile, cellulose, nylon, polyparaphenylenebenzobisoxazole, polyacrylate and glass, or mixtures thereof.

Additionally, in a particular embodiment of the present disclosure, the electrode preferably has a very low porosity of 0 to 10 vol % and indefinitely measured or immeasurable air permeability. For example, the air permeability of the electrode is in the range of 3,000 sec/100 cc or above. In a particular embodiment of the present disclosure, the term 'air permeability' refers to the time during which 100 cc air passes through the electrode. It may be measured in accordance with JIS P8117. Accordingly, the air permeability P1 measured in the electrode having the thickness T1 may be converted to the air permeability P2 when the electrode is 20 µm thick by the equation: $P2=(P1\times20)/T1$. Its unit is sec/100 cc, and it may be interchangeably used with the air permeance and commonly indicated by the Gurely value. Meanwhile, the porosity may be measured using BEL JAPAN BELSORP (BET instrument) using adsorption gas such as nitrogen or by a method such as mercury intrusion porosimetry. Alternatively, in an embodiment of the present disclosure, after calculating the net density of the electrode active material layer from the density (apparent density) of the obtained electrode (electrode active material layer), a composition ratio of materials included in the electrode (electrode active material layer) and the density of each component, the porosity of the electrode active material layer may be calculated from a difference between the apparent density and the net density.

In a particular embodiment of the present disclosure, the inorganic solid electrolyte in the electrode is present in an amount of 15 weight % to 45 weight % based on 100 weight % of the electrode. Additionally, the electrode active material in the electrode is present in an amount of 40 weight % to 80 weight % based on 100 weight % of the electrode. Additionally, the 3-dimensional structure of the fibrous carbon materials arranged cross in the electrode is present in an amount of 5 weight % to 25 weight % based on 100 weight % of the electrode.

The electrode for an all solid type battery according to the present disclosure is such that the filaments of the fibrous carbon materials serving as a conductor are densely arranged cross in the form of a 3-dimensional mesh of nonwoven fabric-like shape. Additionally, the mixture including the inorganic solid electrolyte and the electrode active material is filled in the 3-dimensional structure and uniformly dispersed in the electrode. By this structural feature, the electrode for an all solid type battery according to the present disclosure has higher electron conductivity than the conventional electrodes for all solid type batteries.

In a particular embodiment of the present disclosure, the inorganic solid electrolyte is not limited to a particular type of substance and may include any type of inorganic solid electrolyte commonly used in all solid type batteries, and may be properly selected and used according to battery characteristics.

In an embodiment of the present disclosure, the inorganic solid electrolyte may be in the form of particles, and the particles may include at least one type of primary particles and secondary particles formed by agglomeration of primary particles. Additionally, the inorganic solid electrolyte particles may have the particle size ranging from 200 nm to 5 µm.

In a particular embodiment of the present disclosure, the inorganic solid electrolyte is not limited to a particular type of substance, and may include at least one of inorganic solid electrolyte such as a crystalline solid electrolyte, a non-crystalline solid electrolyte and a glass ceramic solid electrolyte. In the present disclosure, the solid electrolyte may include at least one selected from an oxide-based solid electrolyte and a sulfide-based solid electrolyte.

In an embodiment of the present disclosure, the solid electrolyte includes an oxide-based inorganic solid electrolyte in whole or at least in part, for example, 80 weight % or more, 90 weight % or more, and 99 weight % or more of the solid electrolyte. Specific examples of the inorganic solid electrolyte are LLTO-based compound $(La,Li)TiO_3$, $Li_6La_2CaTa_2O_{12}$, $Li_6La_2ANb_2O_{12}$(A=Ca, Sr), $Li_2Nd_3TeSO_{12}$, $Li_3BO_{2.5}N_{0.5}$, $Li_9SiAlO_8$, LAGP-based compound $(Li_{1+x}Al_xGe_{2-x}(PO_4)_3$, where $0 \leq x \leq 1$, $0 \leq y \leq 1$), LATP-based compound $(Li_{1+x}Al_xTi_{2-x}(PO_4)_3$, where $0 \leq x \leq 1$, $0 \leq y \leq 1$) such as $Li_2O$—$Al_2O_3$—$TiO_2$—$P_2O_5$, $Li_{1+x}Ti_{2-x}Al_xSi_y(PO_4)_{3-y}$ (where $0 \leq x \leq 1$, $0 \leq y \leq 1$), $LiAl_xZr_{2-x}(PO_4)_3$ (where $0 \leq x \leq 1$, $0 \leq y \leq 1$), $LiTi_xZr_{2-x}(PO_4)_3$ (where $0 \leq x \leq 1$, $0 \leq y \leq 1$), LPS-based compound such as $Li_2S$—$P_2S_5$, $Li_{3.833}Sn_{0.833}As_{0.166}S_4$, $Li_4SnS_4$, $Li_{3.25}Ge_{0.25}P_{0.75}S_4$, $B_2S_3$—$Li_2S$, $xLi_2S$-(100–X)$P_2S_5$ (x is 70~80), $Li_2S$—$SiS_2$—$Li_3N$, $Li_2S$—$P_2S_5$—LiI, $Li_2S$—$SiS_2$—LiI, $Li_2S$—$B_2S_3$—LiI, $Li_3N$, LISICON, LIPON-based compound $(Li_{3+y}PO_{4-x}N_x$, where $0 \leq x \leq 1$, $0 \leq y \leq 1$), Thio-LISICON-based compound such as $Li_{3.25}Ge_{0.25}P_{0.75}S_4$, perovskite-based compound ((La, Li)$TiO_3$), NASICON-based compound such as $LiTi_2(PO_4)_3$, LLZO-based compound including lithium, lanthanum, zirconium and oxygen as components, and may include one or more of these.

In a particular embodiment of the present disclosure, the electrode active material may include electrode active materials commonly used in electrochemical devices including lithium ion secondary batteries. In an embodiment of the present disclosure, the electrode active material may be in the form of particles, and the particles may include at least one type of primary particles and secondary particles formed by agglomeration of primary particles. In a particular embodiment of the present disclosure, the electrode active material particles may have the particle size ranging from 200 nm to 50 μm, and the particle size may be, in the above-described range, 30 μm or less, 20 μm or less, or 10 μm or less, or 5 μm or less.

In the present disclosure, when the electrode is a positive electrode, a positive electrode active material may include, but is not limited to, layered compound such as lithium manganese composite oxide ($LiMn_2O_4$, $LiMnO_2$, etc.), lithium cobalt oxide ($LiCoO_2$) and lithium nickel oxide ($LiNiO_2$) or compound with one or more transition metal substitution; lithium manganese oxide of chemical formula $Li_{1+x}Mn_{2-x}O_4$ (where x is 0~0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; Ni site type lithium nickel oxide represented by chemical formula $LiNi_{1-x}M_xO_2$ (where M=Co, Mn, Al, Cu, Fe, Mg, B or Ga, x=0.01~0.3, for example, $LiNi_{0.8}Mn_{0.1}O_{0.1}$); lithium manganese composite oxide represented by chemical formula $LiMn_{2-x}M_xO_2$ (where M=Co, Ni, Fe, Cr, Zn or Ta, x=0.01~0.1) or $Li_2Mn_3MO_8$ (where M=Fe, Co, Ni, Cu or Zn); $LiMn_2O_4$ with partial substitution of alkali earth metal ion for Li in chemical formula; disulfide compound; $Fe_2(MoO_4)_3$, and mixtures thereof.

In the present disclosure, when the electrode is a negative electrode, a negative electrode active material may include lithium metal oxide, carbon such as non-graphitizable carbon and graphite-based carbon; $Li_xFe_2O_3(0 \leq x \leq 1)$, $Li_xWO_2$ ($0 \leq x \leq 1$), $Sn_xMe_{(a)1-x}Me_{(b)y}O_z(Me_{(a)}$: Mn, Fe, Pb, Ge; metal composite oxide such as $Me_{(b)}$:Al, B, P, Si, Groups 1, 2 and 3 elements in the periodic table, halogen; $0<x \leq 1$; $1 \leq y \leq 3$; $1 \leq z \leq 8$); lithium metal; lithium alloy; silicon-based alloy; tin-based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymer such as polyacetylene; Li—Co—Ni-based material; titanium oxide, and mixtures thereof.

In an embodiment of the present disclosure, the electrode may include a current collector, and the electrode having the above-described feature may be coated on at least one side surface of the current collector. The current collector is not limited to a particular type when it has high conductivity while not causing a chemical change to the corresponding battery, and for example, stainless steel, copper, aluminum, nickel, titanium, sintered carbon, or aluminum or stainless steel treated with carbon, nickel, titanium, and silver on the surface, and may be properly selected according to the polarity of the electrode. For example, when the electrode is a positive electrode, a metal foil including aluminum may be used for the current collector, and when the electrode is a negative electrode, a metal foil including copper may be used for the current collector. The thickness of the current collector is not particularly limited, and may be, for example, 5 μm to 200 μm.

Additionally, the present disclosure provides a method for manufacturing the electrode for an all solid type battery having the above-described feature. FIGS. 1 to 4 show schematically the electrode manufacturing method according to the present disclosure. With reference to this, the electrode manufacturing method according to the present disclosure will be described in detail.

The electrode manufacturing method according to the present disclosure includes (S10) to (S50) as follows:

(S10) preparing a nonwoven fabric precursor in which a plurality of polymer filaments is gathered;

(S20) preparing an electrode forming slurry;

(S30) mixing the nonwoven fabric precursor obtained in (S10) with the slurry to form a mix phase;

(S40) drying the mix phase to obtain a preliminary electrode;

(S50) pressing the preliminary electrode; and (S60) a sintering step of heating the pressed preliminary electrode to carbonize the polymer filaments.

In an embodiment of the present disclosure, among the steps, (S10) and (S20) may not be performed in a sequential order, and may be performed at the same time, or the process of (S10) may be performed after the process of (S20) is performed.

First, a nonwoven fabric precursor in which polymer filaments are gathered is prepared (S10). In the present disclosure, the term 'nonwoven fabric precursor' represents that polymer microfilaments spun to make a nonwoven fabric are simply deposited or gathered and did not go through a pressing step for linking of the filaments. In a particular embodiment of the present disclosure, the spinning of filaments may be performed by an electrospinning method. The electrospinning is a method that obtains fibers of continuous phase having a few nm of diameter at a minimum using an electric field. An electrospinning apparatus generally includes a high voltage power supply, a spinneret and a collector to collect fibers. During electrospinning, a polymer solution and the collector are electrically charged on the opposite electrodes. The polymer solution fed through the nozzle end is stretched in a conic shape (taylor) by an electromagnetic repulsive force and a Coulomb force under the applied voltage and spun in the form of filaments and fibers are collected in the collector. When electrospinning is used, filaments can be finely formed on a few ten to a few micron level by controlling the spinning process including the aperture of the spinning nozzle and the voltage and/or current range, and thus, it is advantageous for the formation of a nonwoven fabric having high porosity.

Meanwhile, in a particular embodiment of the present disclosure, the electrospinning is preferably wet spinning by which spun filaments are gathered and/or deposited in a solution. When filaments are gathered by a wet spinning method, the gathered filaments are pressed such that the filaments are not entangled and they are uniformly distributed in a solution until a nonwoven fabric is formed, and thus it is advantageous for uniform pore formation. For example, when a nonwoven fabric precursor is prepared by a wet spinning method, a polymer material (e.g., polyacrylonitrile) as described above is dissolved in an appropriate dispersion medium, for example, DMF, to prepare a polymer solution, which is then spun into microfilaments in a coagulant solution such as ethanol, and the filaments gathered as a result of spinning are collected, obtaining a nonwoven fabric precursor. Additionally, the nonwoven fabric precursor may go through additional freeze-drying to dry the solvent such as the dispersion medium or the coagulant solution.

FIG. 1 shows an electrospinning process according to an embodiment of the present disclosure, showing schematically polymer filament 20 fed from a spinning apparatus 10 into a coagulant solution 30.

Subsequently, an electrode forming slurry is prepared (S20). The electrode slurry may be prepared by dispersing electrode materials including an inorganic solid electrolyte and an electrode active material in an appropriate solvent including one selected from xylene, cyclopentane, cyclohexane, hexane, anhydrous hexane, toluene, ether, tertiary alcohol, secondary amine, and tertiary amine, or mixtures thereof. In an embodiment of the present disclosure, the electrode slurry may be prepared by introducing solids including oxide-based solid electrolyte particles, for example, LAGP and electrode active material particles into anhydrous xylene at a weight ratio of 30:70 and mixing them. The mixing method may include common mixing methods including mortar mixing, and is not limited to a particular method.

In an embodiment of the present disclosure, the electrode material may optionally further include binder resin. The binder resin provides the bond strength between electrode materials in a preliminary electrode, and may include, without limitation, PVdF-based binder resin or acrylic binder resin that is used as an electrode binder. Meanwhile, in a specific embodiment of the present disclosure, when the solid electrolyte is a sulfide-based solid electrolyte, a dispersant of the electrode slurry preferably includes a non-polar solvent with the polarity index of 3 or less, and in this instance, the binder resin preferably includes rubber-based binder resin in view of solubility. The rubber-based binder resin may include at least one selected from natural rubber, butyl-based rubber, bromo-butyl-based rubber, chlorinated butyl-based rubber, styrene isoprene-based rubber, styrene-ethylene-butylene-styrene-based rubber, acrylonitrile-butadiene-styrene-based rubber, polybutadiene-based rubber, nitrile butadiene-based rubber, styrene butadiene-based rubber, styrene butadiene styrene-based rubber (SBS) and ethylene propylene diene monomer (EPDM)-based rubber. In the present disclosure, the binder resin may be lost or carbonized in the electrode at least in part or in whole in a sintering step described below.

Subsequently, a mix phase in which the nonwoven fabric precursor obtained in (S10) and the electrode forming slurry are mixed is obtained (S30). The mix phase may be prepared by impregnating the nonwoven fabric precursor with the electrode slurry so that the nonwoven fabric precursor is filled with the electrode forming slurry. Through this step, solids including inorganic solid electrolyte particles, electrode active material particles and a binder are filled in pores formed between the cross-arranged polymer filaments of the nonwoven fabric precursor.

The nonwoven fabric precursor is before the spun filaments are compressed and thus has a larger pore size than the nonwoven fabric obtained after compression. Accordingly, when the nonwoven fabric precursor is filled with the electrode forming slurry, there is a fill ratio improvement effect compared to the finished nonwoven fabric and it is very advantageous for very uniform dispersed phase of the components, the conductive material, the electrode active material particles, the inorganic solid electrolyte particles and the binder, in the finally prepared electrode. Alternatively, in an embodiment of the present disclosure, the mix phase may be prepared in the form of a dispersion in which the nonwoven fabric precursor and the electrode slurry are mixed and the components are uniformly dispersed. In this instance, mixing of the nonwoven fabric precursor and the electrode forming slurry may be performed by mortar mixing.

Figure 2:
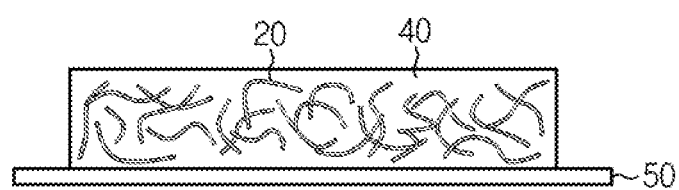
FIG. 2 shows exemplarily a mix phase in mixed state of polymer filaments and an electrode forming slurry coated on the surface of a current collector.

In an embodiment of the present disclosure, the mix phase may be prepared in the form of a dispersion in which the nonwoven fabric precursor and the slurry are mixed and the components are uniformly dispersed. In an embodiment of the present disclosure, mixing of the nonwoven fabric precursor and the electrode forming slurry may be performed by a mechanical (physical) mixing method. The mechanical mixing method is not limited to a particular method, and may be properly selected from at least one of manual mixing and automatic mixing methods. For example, the mixing may be performed by introducing the nonwoven fabric precursor and the electrode forming slurry into a mortar having a predetermined volume and mixing (mortar mixing) using a pestle, and besides, common screw-type, impeller-type, paddle-type and hammer-type mixers may be properly selected and used. The nonwoven fabric precursor is such that filaments are gathered loosely and irregularly like cotton, and by this mixing process, the electrode forming slurry may penetrate the pores between the filaments of the nonwoven fabric precursor, and the nonwoven fabric precursor having low mechanical strength may partially break up and may be mixed with the slurry to become a slurry. Meanwhile, in a particular embodiment of the present disclosure, the mix phase may be prepared so that it is coated on the surface of the current collector to a predetermined thickness and introduced in a subsequent process. FIG. 2 shows exemplarily that a mix phase in mixed state of the polymer filaments 20 and the electrode forming slurry 40 is coated on the surface of the current collector 50.

Subsequently, the result of (S30) is dried to obtain a preliminary electrode (S40). In the drying step, the solvent in the electrode forming slurry is removed, and dry solids (preliminary electrode) are obtained, in which solids including the polymer filaments and the electrode active material in the slurry are linked with a mechanically low strength. When binder resin is included, the binder resin assists in their linking. In the above step, the drying method is not limited to a particular type. The drying is preferably performed under the temperature and time conditions in which composition change or degradation of the components does not occur, and the drying may be performed in room temperature or heated condition as needed. Additionally, hot air or cool air may be added as needed.

Figure 3:
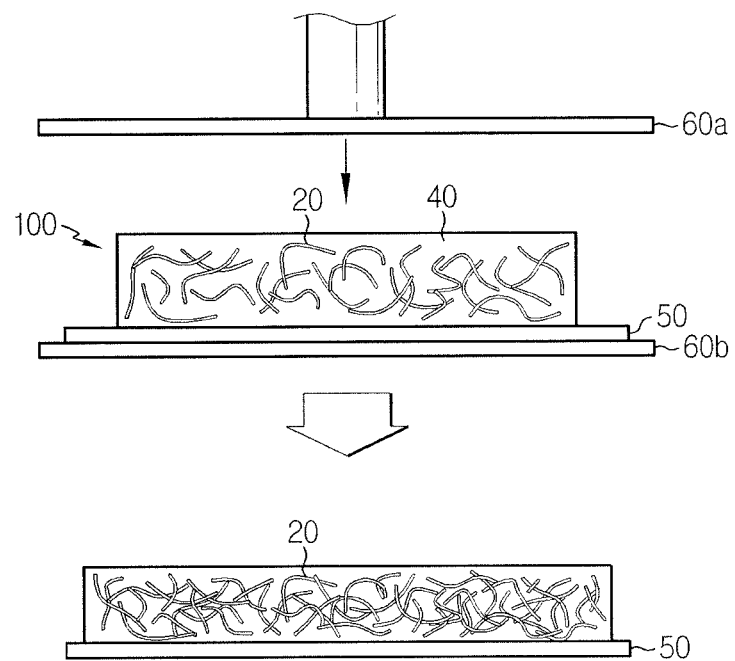
FIG. 3 shows schematically a pressing process according to an embodiment of the present disclosure.

Subsequently, the preliminary electrode as a result of (S40) is pressed (S50). In a particular embodiment of the present disclosure, appropriate pressure may be applied, taking into account the porosity of the electrode finally obtained. In a particular embodiment of the present disclosure, the pressure ranging from 100 MPa to 1,000 MPa may be applied. The linking of the components of the electrode can be tightly maintained by the applied pressure, and thus the structure of the electrode can be stabilized and exhibit desired porosity. In an embodiment of the present disclosure, the pressing may be performed using at least one properly selected from known pressing apparatuses such as a hot press and a hydraulic press. FIG. 3 shows schematically a pressing process according to an embodiment of the present disclosure, and with reference to FIG. 3, the preliminary electrode 100 as a result of drying is pressed down by a top pressing apparatus 60a while being supported on a support 60b of the pressing apparatus.

Figure 4:
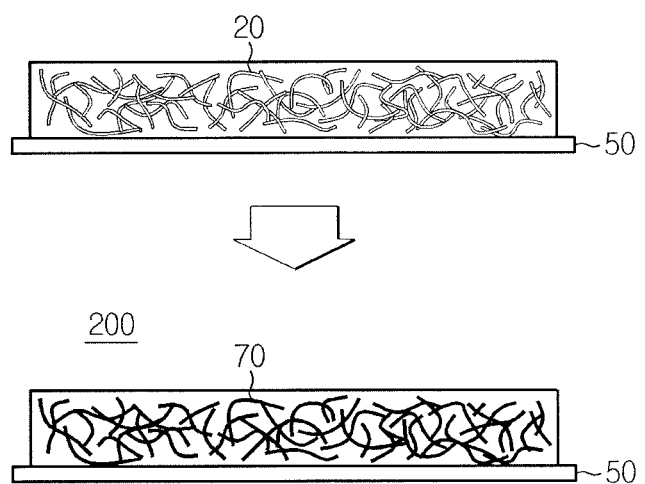
FIG. 4 shows schematically an electrode according to an embodiment of the present disclosure in which polymer filaments are carbonized into fibrous carbon materials according to a sintering process.

Subsequently, a sintering process is performed by heating the pressed preliminary electrode as a result of (S50) to carbonize the polymer filaments (S60). FIG. 4 shows schematically that the polymer filaments 20 are carbonized into fibrous carbon materials 70 according to a sintering process as a result of sintering the preliminary electrode 100 to produce an electrode 200. By this sintering process, the polymer material that constitutes the nonwoven fabric precursor is carbonized into fibrous carbon materials, and for example, the carbon materials are carbon nanofiber. In this step, the sintering temperature may be properly selected in the range of about 500° C. to 1,000° C., and selection of the sintering temperature may be properly adjusted according to the polymer material used. Additionally, the sintering temperature is preferably in the temperature range in which the inorganic solid electrolyte and the electrode active material used are not degraded, taking their heat resistance property into account. In an embodiment of the present disclosure, the sintering temperature may be properly adjusted in the range of 600° C. to 1,200° C. according to the material of the polymer filaments used, and for example, in the case of polyacrylonitrile, the sintering temperature is controlled to maintain the range of about 800° C. to 1,000° C. In an embodiment of the present disclosure, the sintering may be performed in inert gas or $N_2$ atmosphere. Additionally, the inorganic solid electrolyte may be sintered together by this sintering process. In an embodiment of the present disclosure, when an oxide-based inorganic solid electrolyte is used as the inorganic solid electrolyte substance, this sintering process may increase the contact between the inorganic solid electrolyte particles and further improve the ionic conductivity.

The electrode for an all solid type battery according to the present disclosure has a high fill ratio of the electrode forming slurry because the nonwoven fabric precursor is filled with the electrode forming slurry before compression so that the electrode forming slurry can be uniformly filled in the pores of the nonwoven fabric, and the slurry filling process is followed by carbonization of polymer filaments into fibrous carbon materials (for example, CNF) which are used as a conductive material. Accordingly, as opposed to an electrode slurry generally prepared by introducing a conductive material, electrode active material particles and an inorganic solid electrolyte into a solvent, the component coagulation problem is solved, and each component can exhibit a very high level of uniform dispersion phase in the electrode. Accordingly, the 3-dimensional mesh structure of the fibrous carbon materials manufactured by the manufacturing method of the present disclosure can play a role in the electron movement throughout the electrode.

Additionally, the 3-dimensional mesh structure made by the above-described method exhibits flexibility and rigidity simultaneously, and thus the electrode having the same is less likely to deform, and has improved durability against an external force applied to the battery.

Meanwhile, the present disclosure provides an all solid type battery including the electrode. The all solid type battery may include a negative electrode, a positive electrode and a solid electrolyte membrane interposed between the negative electrode and the positive electrode, and at least one of the negative electrode and the positive electrode has the above-described feature.

The solid electrolyte membrane electrically isolates the positive electrode and the negative electrode and has ionic conductivity, and is not limited to a particular type and includes those commonly used as electrolyte membranes for all solid type batteries. In a particular embodiment of the present disclosure, the solid electrolyte membrane may include at least one of a polymer-based solid electrolyte material and an inorganic solid electrolyte material. The inorganic solid electrolyte may include a crystalline solid electrolyte, a non-crystalline solid electrolyte and a glass ceramic solid electrolyte. In an embodiment of the present disclosure, the solid electrolyte may include a sulfide-based solid electrolyte, and the sulfide-based solid electrolyte may include, for example, lithium sulfide, silicon sulfide, germanium sulfide and boron sulfide. Specific examples of the inorganic solid electrolyte may be a LPS type solid electrolyte such as $Li_2S$—$P_2S_5$, $Li_{3.833}Sn_{0.833}As_{0.166}S_4$, $Li_4SnS_4$, $Li_{3.25}Ge_{0.25}P_{0.75}S_4$, $B_2S_3$—$Li_2S$, $xLi_2S$-$(100-x)P_2S_5$ (x is 70–80), $Li_2S$—$SiS_2$—$Li_3N$, $Li_2S$—$P_2S_5$—$LiI$, $Li_2S$—$SiS_2$—$LiI$, $Li_2S$—$B_2S_3$—$LiI$, $Li_3N$, LISICON, LIPON (e.g., $Li_{3+y}PO_{4-x}N_x$), Thio-LISICON (e.g., $Li_{3.25}Ge_{0.25}P_{0.75}S_4$) and LATP (e.g., $Li_2O$—$Al_2O_3$—$TiO_2$—$P_2O_5$), and may include, but is not limited to, one or more of these.

Hereinafter, the present disclosure will be described in detail with reference to examples. The examples according to the present disclosure may, however, be modified in many different forms and should not be construed as limited to the examples described below. The examples are provided to fully explain the present disclosure to those skilled in the art.

1. Manufacture of an Electrode

Example 1-1

1) Preparation of a Nonwoven Fabric Precursor

Figure 5:
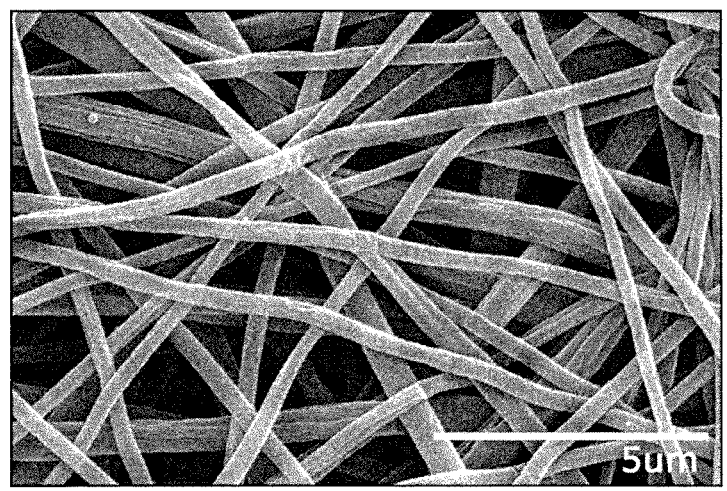
FIG. 5 is a scanning electron microscope (SEM) image of electrospun polymer filaments.

Polyacrylonitrile (Mn=100,000 g/mol) was dissolved in DMF to prepare 12 wt % solution. After electrospinning (15 kV, the distance from a current collector plate: 10 cm) the prepared polymer solution in 500 ml of a methanol coagulation bath at the rate of 1.0 ml/min, a precipitated nonwoven fabric precursor was recovered and freeze-dried for 12 hours to obtain a nonwoven fabric precursor. The polymer filaments of the electrospun nonwoven fabric precursor were observed as shown in FIG. 5. As a result of SEM image shape analysis, the polymer filaments having the diameter ranging from about 500 nm to 2 μm and the length ranging from about 50 μm to 200 μm were obtained in the nonwoven fabric precursor. The electrospinning was performed using KD Scientific Inc. (model 100).

2) Preparation of an Electrode Forming Slurry

Positive electrode active material $LiNi_{0.8}Mn_{0.1}O_{0.1}$ and inorganic solid electrolyte $Li_2O$—$Al_2O_3$—$TiO_2$—$P_2O_5$ (LATP) particles were introduced into NMP at a weight ratio of 70:30 and mortar mixing was performed at the concentration of 50 wt % solids to obtain a uniform electrode forming slurry.

3) Preparation of a Nonwoven Fabric Precursor Filled with a Slurry

The prepared nonwoven fabric precursor was introduced into the prepared electrode forming slurry and mixed through mortar mixing to finally obtain a mix phase in which the slurry is mixed between the polymer filaments of the nonwoven fabric precursor. In this instance, the mixture of the inorganic solid electrolyte and the positive electrode active material and the nonwoven fabric precursor were mixed at a weight ratio of 80:20. The obtained mix phase was coated on an aluminum (Al) thin film (20 μm) using a doctor blade, the solvent was dried in a vacuum oven (80° C., 12 hr), and rolling was performed using a hot press at 100° C. by a force of 400 Mpa. After rolling, a preliminary electrode (thickness 100 μm) was obtained in which the electrode active material and the electrolyte were mixed in the nonwoven fabric type 3-dimensional mesh structure.

4) Formation of a Conductive Network through Carbonization of a Nonwoven Fabric Precursor The preliminary electrode was put in a sintering furnace chamber and thermally treated in $N_2$ atmosphere at the controlled temperature of the sintering furnace of 8000° C.~1,000° C. to carbonize polyacrylonitrile fibers in the preliminary electrode, obtaining an electrode for an all solid-state battery. In this instance, the obtained electrode for an all solid-state battery has a 3-dimensional mesh structure in which carbon materials as a result of carbonizing the polyacrylonitrile fibers are entangled and arranged cross and linked to each other, such that the inside of the mesh structure is filled with the mixture of the inorganic solid electrolyte and the electrode active material particles.

Example 2-1

Except a mixture of an inorganic solid electrolyte and a positive electrode active material and a nonwoven fabric precursor were mixed at a weight ratio of 90:10, a solid electrolyte membrane was prepared by the same method as example 1.

Comparative Example 1-1

A positive electrode active material $LiNi_{0.8}Mn_{0.1}O_{0.1}$Ni-site lithium nickel oxide, an inorganic solid electrolyte $Li_2O$—$Al_2O_3$—$TiO_2$—$P_2O_5$, a conductive material VGCF (Denka, diameter: about 150 nm, average length: about 6 μm) and a binder PVDF were dispersed in NMP at a weight ratio of 52.5:22.5:20:5 to finally prepare a slurry with 65 weight % solids, and this was coated on an aluminum (Al) thin film to the thickness of 200 μm. Subsequently, the solvent was dried in a vacuum oven (80° C., 12 hr), and the residual solvent was removed. Subsequently, rolling was performed using a hot press at 100° C. by a force of 400 MPa. An electrode (thickness: 100 μm) was obtained therefrom.

Comparative Example 2-1

Except a positive electrode active material $LiNi_{0.8}Mn_{0.1}O_{0.1}$Ni-site lithium nickel oxide, an inorganic solid electrolyte $Li_2O$—$Al_2O_3$—$TiO_2$—$P_2O_5$, a conductive material VGCF (Denka, diameter: about 150 nm, length: about 6 μm) and a binder PVDF were used at a weight ratio of 59.5:25.5:10:5, an electrode (thickness: 100 μm) was prepared by the same method as comparative example 2-1.

2. Fabrication of a Symmetric Cell (Example 1-2, Example 2-2, Comparative Example 1-2 and Comparative Example 2-2)

A symmetric cell was fabricated using the electrode obtained in example 1-1, example 2-1, comparative example 1-1 and comparative example 2-1. The symmetric cell was prepared by stacking first electrode/solid electrolyte membrane/second electrode in a sequential order, applying, the pressure of 100 MPa and sintering at the temperature of 600° C. In each example, for the first electrode and the second electrode, two electrodes prepared through the same example were used. That is, a symmetric cell was fabricated using two electrodes prepared through example 1-1 for the battery of example 1-2, and the battery of example 2-2 used the electrode obtained through example 2-1, the battery of comparative example 1-2 used the electrode obtained through comparative example 1-1, and the battery of comparative example 2-2 used the electrode obtained through comparative example 2-1. Additionally, the solid electrolyte membrane was 100% $Li_2O$—$Al_2O_3$—$TiO_2$—$P2O5$ (LATP).

3. Measurement of Ionic Conductivity

For each battery of example 1-2, example 2-2, comparative example 1-2 and comparative example 2-2, the electrochemical impedance spectroscopic analysis results were obtained under the conditions of amplitude of 10 mV and scan range of 0.1 hz to 1 Mhz at 25° C. using an analyzer (VMP3, Bio logic science instrument).

4. Measurement of Electrical Conductivity

For each battery of example 1-2, example 2-2, comparative example 1-2 and comparative example 2-2, electrical resistance was measured using Multi probe analyzer (Hioki).

The measurement results of ionic conductivity and electrical resistance are shown in the following table 1.

TABLE 1

|  | Example 1-2 | Example 2-2 | Comparative example 1-2 | Comparative example 2-2 |
|---|---|---|---|---|
| Electrode used | Example 1-1 | Example 2-1 | Comparative example 1-1 | Comparative example 1-2 |
| Thickness (μm) of electrode | 100 | 100 | 100 | 100 |
| Ion conductivity (mS/cm$^2$) | $3.9 \times 10^{-5}$ | $6.5 \times 10^{-4}$ | $1.2 \times 10^{-6}$ | $2.8 \times 10^{-4}$ |
| Electrical resistance (ohm/cm) | 0.455 | 0.322 | 0.710 | 0.523 |

As can be seen from the above Table 1, it was found that the battery including the electrode according to an embodiment of the present disclosure excellent ionic conductivity properties and electrical resistance properties.

DESCRIPTION OF REFERENCE NUMERALS

10: Spinning apparatus
20: Polymer filament
30: Coagulant solution
100: Preliminary electrode
40: Electrode forming slurry
50: Current collector
60*a*: Top pressing apparatus
60*b*: Support
200: Electrode
70: Fibrous carbon material

What is claimed is:

1. A method for manufacturing an electrode for an all solid type battery, comprising:
preparing a nonwoven fabric precursor in which a plurality of polymer filaments is gathered;
preparing an electrode forming slurry;
mixing the nonwoven fabric precursor with the electrode forming slurry to form a mix phase;
drying the mix phase to obtain a preliminary electrode;
pressing the preliminary electrode; and
performing sintering by thermally treating the pressed preliminary electrode to carbonize the polymer filaments,
wherein the electrode forming slurry includes an electrode active material, an inorganic solid electrolyte and a solvent.

2. The method for manufacturing an electrode for an all solid type battery according to claim 1, wherein the polymer filaments are prepared by spinning a polymer material by an electrospinning method.

3. The method for manufacturing an electrode for an all solid type battery according to claim 1, wherein the electrode active material and the inorganic solid electrolyte are in a form of particles.

4. The method for manufacturing an electrode for an all solid type battery according to claim 1, wherein the inorganic solid electrolyte includes an oxide-based inorganic solid electrolyte.

5. The method for manufacturing an electrode for an all solid type battery according to claim 1, wherein the pressing is performed by a hot pressing method.

6. The method for manufacturing an electrode for an all solid type battery according to claim 1, wherein the polymer filaments are 50 μm to 500 μm long.

* * * * *